(12) United States Patent
Yang et al.

(10) Patent No.: US 11,645,005 B2
(45) Date of Patent: May 9, 2023

(54) NEAR-MEMORY COMPUTING SYSTEMS AND METHODS

(71) Applicant: PetaIO Inc., Santa Clara, CA (US)

(72) Inventors: Fan Yang, Fremont, CA (US); Peirong Ji, San Mateo, CA (US); Changyou Xu, San Jose, CA (US)

(73) Assignee: PETAIO INC., Santa Clara, CA (US)

( * ) Notice: Subject to any disclaimer, the term of this patent is extended or adjusted under 35 U.S.C. 154(b) by 0 days.

(21) Appl. No.: 17/187,483

(22) Filed: Feb. 26, 2021

(65) Prior Publication Data

US 2022/0276803 A1  Sep. 1, 2022

(51) Int. Cl.
*G06F 3/06* (2006.01)

(52) U.S. Cl.
CPC .......... *G06F 3/0656* (2013.01); *G06F 3/0613* (2013.01); *G06F 3/0659* (2013.01); *G06F 3/0683* (2013.01)

(58) Field of Classification Search
CPC .... G06F 3/0656; G06F 3/0613; G06F 3/0659; G06F 3/0683
See application file for complete search history.

(56) References Cited

U.S. PATENT DOCUMENTS

| | | | |
|---|---|---|---|
| 10,802,883 B2 * | 10/2020 | Alameldeen | G06F 9/485 |
| 2020/0042247 A1 * | 2/2020 | Ryu | G06F 3/0659 |
| 2021/0019076 A1 * | 1/2021 | Kim | G06F 3/0604 |
| 2021/0224185 A1 * | 7/2021 | Zhou | G06F 12/0246 |

\* cited by examiner

*Primary Examiner* — Idriss N Alrobaye
*Assistant Examiner* — Richard B Franklin
(74) *Attorney, Agent, or Firm* — Stevens Law Group; David R. Stevens

(57) ABSTRACT

Example near-memory computing systems and methods are described. In one implementation, a system includes a host command processing system and a computational engine associated with a solid-state drive. In some situations, the computational engine includes multiple versatile processing unit slices coupled to one another. The multiple versatile processing unit slices are configured to perform different tasks in parallel with one another. The system also includes a host direct memory access module configured to access memory devices independently of a central processing unit.

7 Claims, 13 Drawing Sheets

US 11,645,005 B2

NEAR-MEMORY COMPUTING SYSTEMS AND METHODS

TECHNICAL FIELD

The present disclosure relates to systems and methods that provide local processing of data for storage devices.

BACKGROUND

Advancements in computing technology has increased the demand for high-performance computational storage. New computing systems may utilize near-memory computing (NMC) to bring the computing components close to the storage systems to improve overall performance. In some embodiments, NMC may provide high bandwidth and high efficiency by implementing computations in memory (or near the memory) instead of the processor, thereby reducing data movement.

However, NMC systems may use different computing models based on the particular application. For example, an NMC system for a database application may use a different computing model than an NMC system for a video processing application. Thus, it is desirable to provide a flexible near-memory computing platform that can adapt to different types of applications.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
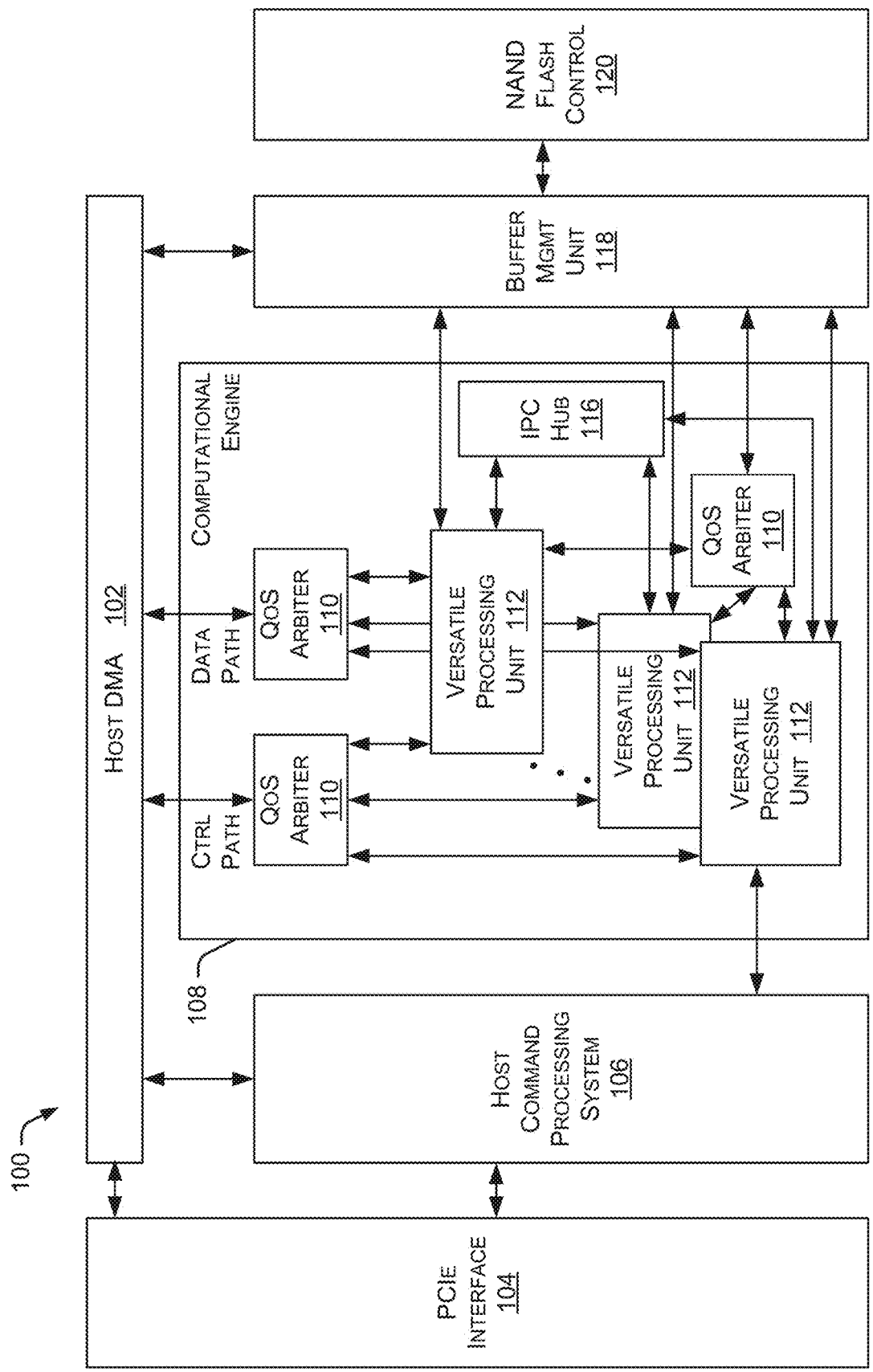
FIG. 1 is a block diagram illustrating an embodiment of an architecture that includes a flexible computing engine for a solid-state drive (SSD) system on chip (SoC) controller.

In the following disclosure, reference is made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

The systems and methods described herein include a near-memory computing (NMC) architecture that includes embedded FPGA/DSP logic, a high bandwidth SRAM system, a real-time processor, and a bus system into the SSD controller. In this NMC architecture, data can be processed locally inside the SSD controller before forwarding to a host memory. This approach provides high performance and flexibility to support multiple different applications.

FIG. 1 is a block diagram illustrating an embodiment of an architecture 100 that includes a flexible computing engine 108 for a solid-state drive (SSD) system on chip (SoC) controller. Flexible computing engine 108 is also referred to herein as computational engine 108. In some embodiments, architecture 100 is used with a non-volatile memory express (NVME)-based SSD controller, which may include high-bandwidth local SRAM, a local bus to AXI interface, a message queue interface to CPU group, a bus interface to host DMA (HDMA) data path, a QoS arbiter, a global AXI matrix, and a versatile processing unit (VPU).

In the example of FIG. 1, a host DMA module 102 communicates with a PCIe (Peripheral Component Interconnect Express) interface 104, a host command processing system 106, QoS arbiters 110 in computational engine 108, and a buffer management unit 118. PCIe interface 104 provides a high-speed serial computer bus that supports high-speed communication between the PCIe interface and host DMA module 102 and host processing system 106. In some embodiments, host DMA module 102 allows various components shown in FIG. 1 to access memory devices independently of a central processing unit (CPU) or other processor.

As shown in FIG. 1, computational engine 108 also includes multiple versatile processing units 112 and an IPC (inter process communication) hub 116. Each of the multiple versatile processing units 112 may be referred to as a versatile processing unit "slice". In some embodiments, an interconnect allows the multiple versatile processing units to communicate with one another. Further, the multiple versatile processing units can perform different tasks in parallel with one another. IPC hub 116 delivers messages from one CPU to another CPU which makes the communication between CPUs efficient and low latency. In some embodiments, NAND flash control 120 manages and/or controls one or more NAND flash devices.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
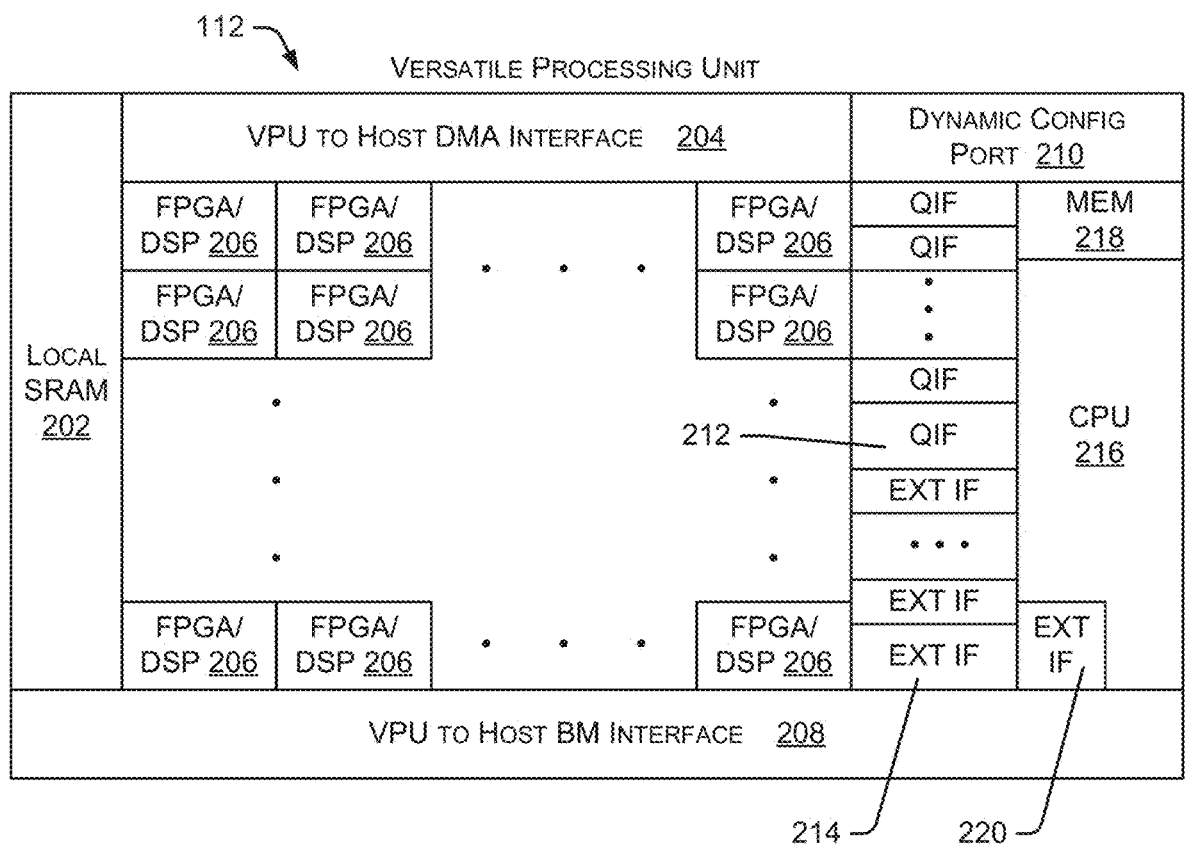
FIG. 2 is a block diagram illustrating an embodiment of a versatile processing unit contained in the flexible computing engine of FIG. 1.

FIG. 2 is a block diagram illustrating an embodiment of versatile processing unit 112 contained in computational engine 108 of FIG. 1. Each versatile processing unit 112 includes a high performance local SRAM 202, a VPU to host DMA interface 204, a VPU to host buffer management (BM) unit interface 208, and multiple field-programmable gate array/digital signal processor (FPGA/DSP) modules 206. Each versatile processing unit 112 also includes a dynamic configuration port 210, a QIF (Queue Interface) 212, an EXT IF (Extension Interface) 214 and 220, a CPU 216, and a memory (MEM) 218.

Each FPGA/DSP module 206 in a particular versatile processing unit 112 can get data from the host memory directly through the HDMA data path and store into local SRAM 202 for processing. Additionally, each FPGA/DSP module 206 can utilize the read data path to read the data from buffer management unit 118. Since multiple versatile processing unit slices 112 share a common data path, a configurable QoS arbiter 110 is used in some embodiments to optimize (e.g., allocate) the access to the data path.

In some situations, multiple FPGA/DSP modules 206 cooperate with one another to complete a particular task. In these situations, data channels can be established through the configurable connection. In some embodiments, the configurable connection is the connection between the multiple versatile processing units 112. Data forwarded through the configurable connection between multiple versatile processing unit slices 112 can reduce the bandwidth requirement of the central buffer and lower the latency in exchanging data.

As discussed herein, the multiple FPGA/DSP modules 206 provide flexibility and computing power for different domain-specific applications. However, many systems need control from CPU 216. Thus, the jobs scheduling in each FPGA/DSP module 206 can be handled by CPU 216 using, for example, the command and status queues between CPU 216 and the versatile processing unit 112.

To enhance the job coordination across multiple versatile processing unit slices 112, the communication channels between CPUs 216 need to be established. As mentioned above, IPC hub 116 delivers messages from one CPU 216 to another CPU 216, which makes the communication between CPUs efficient and low latency. Thus, as a system, the computation power from FPGA/DSP modules 206 can be coordinated via the micro-CPU system and scaled up linearly. In some embodiments, each versatile processing unit slice 112 includes a micro-CPU. "Scaled up" refers to, for example, one versatile processing unit slice 112 has X compute power. If a future system is created with 16 versatile processing unit slices 112, then the compute power would be 16×. In some embodiments, this linear addition of versatile processing unit slices 112 requires a small amount of communication cost and overhead between the CPUs among the multiple versatile processing unit slices 112.

Figure 3:
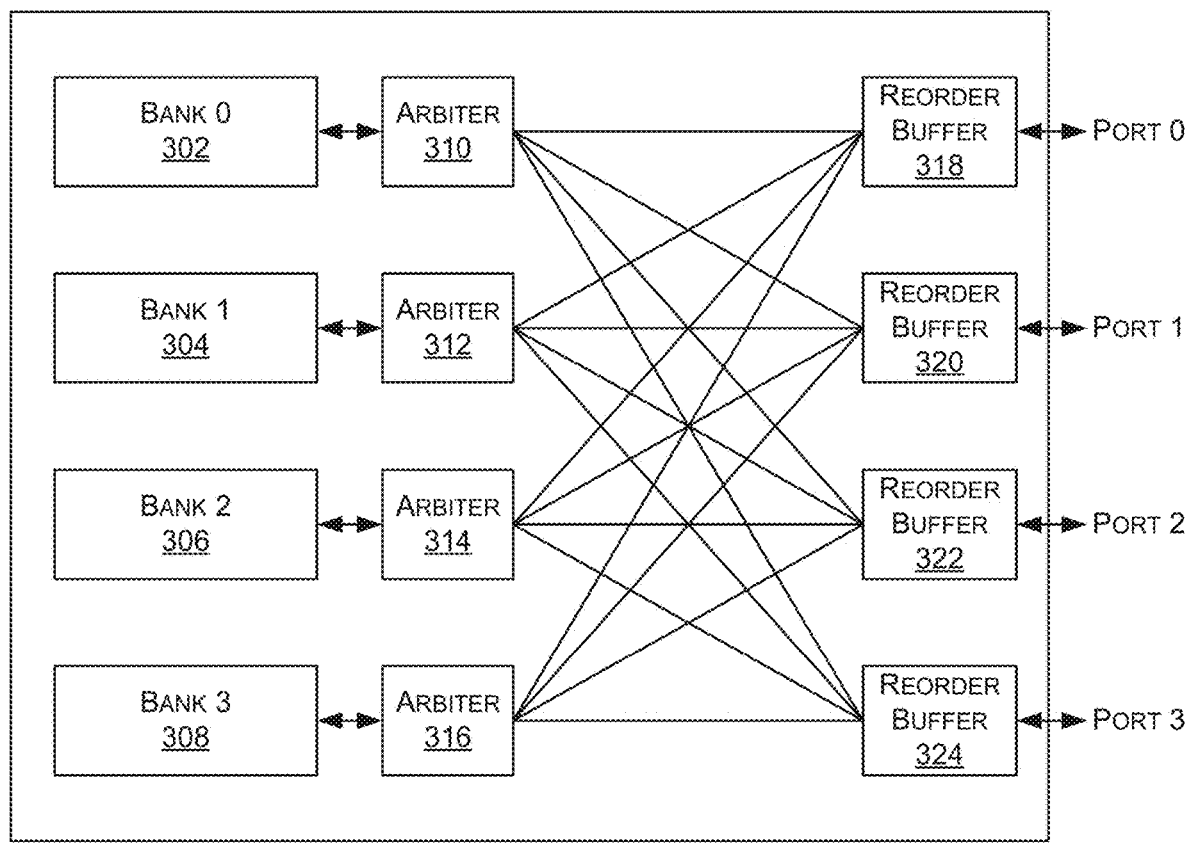
FIG. 3 is a block diagram illustrating an embodiment of a local static random access memory (SRAM) system.

FIG. 3 is a block diagram illustrating an embodiment of a local static random access memory (SRAM) system. In the example of FIG. 3, four banks of memory 302, 304, 306, and 308 are each coupled to an arbiter 310, 312, 314, and 316, respectively. Each of the four arbiters 310, 312, 314, and 316 are coupled to four reorder buffers 318, 320, 322, and 324. Reorder buffer 318 is associated with Port 0, reorder buffer 320 is associated with Port 1, reorder buffer 322 is associated with Port 2, and reorder buffer 324 is associated with Port 3. For purposes of explanation, the example of FIG. 3 illustrates four banks of memory 302, 304, 306, and 308, and four associated arbiters 310, 312, 314, and 316, and four associated reorder buffers 318, 320, 322, and 324. Alternate embodiments may include any number of banks of memory, arbiters, and reorder buffers.

Local SRAM 202 (FIG. 2) provides high bandwidth and high performance for the customized FPGA/DSP modules 206. In some embodiments, the maximum bandwidth local SRAM 202 can provide is defined by:

$$BW_{max} = Byte_{bank} * Num_{bank} * Freq$$

Where Byte bank is the width per bank in a byte, Num_bank is the quantity of banks, and Freq is the operational frequency. For example, when operating at 600 MHz with a 16-Byte wide SRAM bank, the following configuration can provide up to 38.4 GB bandwidth. Four SRAM banks with independent addresses combined with address, command, and data signals provide a flexible configuration.

In the example of FIG. 3, local SRAM 202 can be configured in a parallel mode, a serial mode, and a mixed mode. These different modes provide different bandwidths, capacities, and power consumption combinations. In some embodiments, local SRAM 202 is useful as local cache memory and a temporary computation buffer, which reduces the memory access to the central buffer. Inside local SRAM 202, each port has a reorder buffer (e.g., 318, 320, 322, 324) which supports outstanding transactions sent to different SRAM banks.

Figure 4:
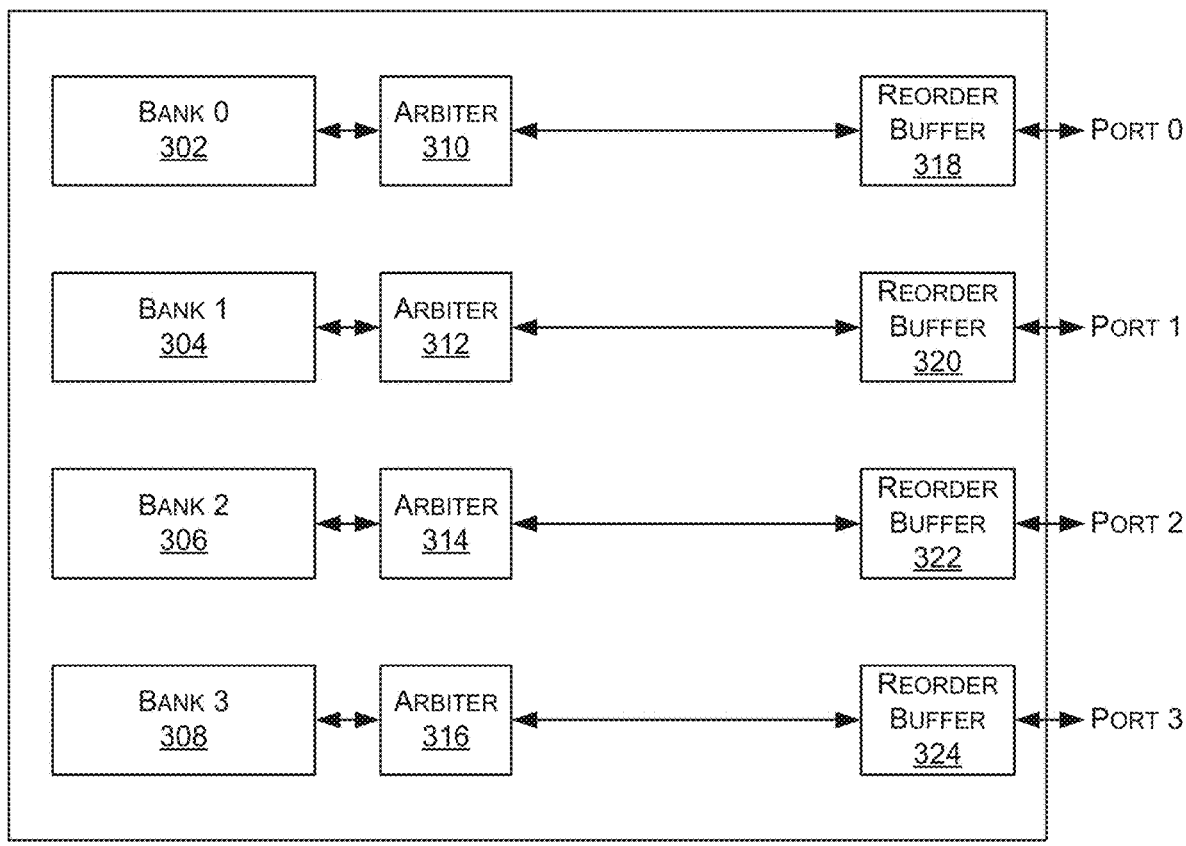
FIG. 4 is a block diagram illustrating an embodiment of a local SRAM memory system operating in a parallel mode.

FIG. 4 is a block diagram illustrating an embodiment of a local SRAM memory system operating in a parallel mode. In some embodiments, the example of FIG. 4 is particularly useful in systems requiring a large bus width, which provides more bandwidth for a client to read and write to a local SRAM.

Figure 5:
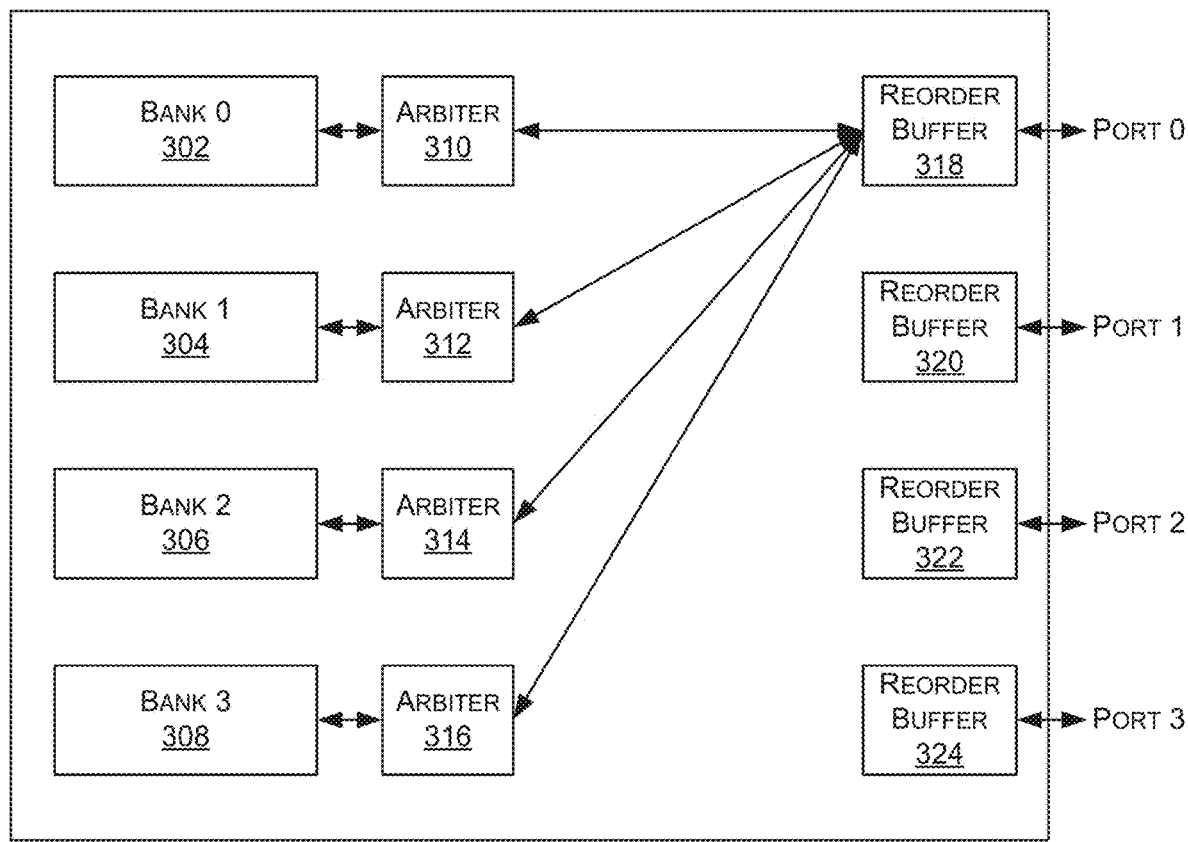
FIG. 5 is a block diagram illustrating an embodiment of a local SRAM memory system operating in a serial mode.

FIG. 5 is a block diagram illustrating an embodiment of a local SRAM memory system operating in a serial mode. In some embodiments, the example of FIG. 5 is particularly useful when the bus width is not large, but the system needs a large memory capacity.

Figure 6:
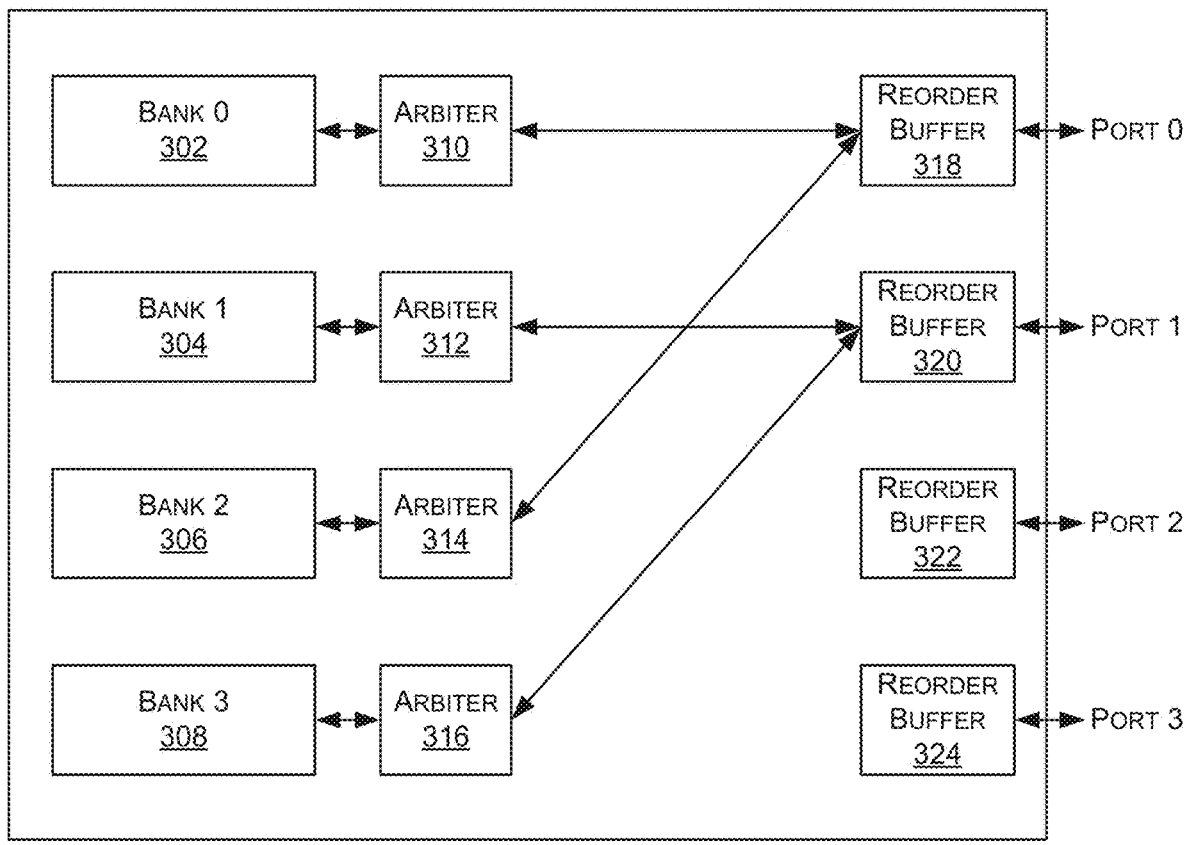
FIG. 6 is a block diagram illustrating an embodiment of a local SRAM memory system operating in a mixed mode.

FIG. 6 is a block diagram illustrating an embodiment of a local SRAM memory system operating in a mixed mode. In some embodiments, the example of FIG. 6 is particularly useful when a system needs to account for the trade-off between the serial mode (e.g., the example shown in FIG. 5) and the parallel mode (e.g., the example shown in FIG. 4). When a certain bandwidth requirement needs to be guaranteed, the serial mode may run at a higher clock rate, but there could be timing closure problems due to the higher clock rate. Using the parallel mode may lower the clock rate, but the connection between the arbiter and the local SRAM can be unstable, which may cause problems in the physical implementation (e.g., rouging problems). Thus, the mixed mode example shown in FIG. 6 provides a trade-off between the serial mode and the parallel mode.

Figure 7:
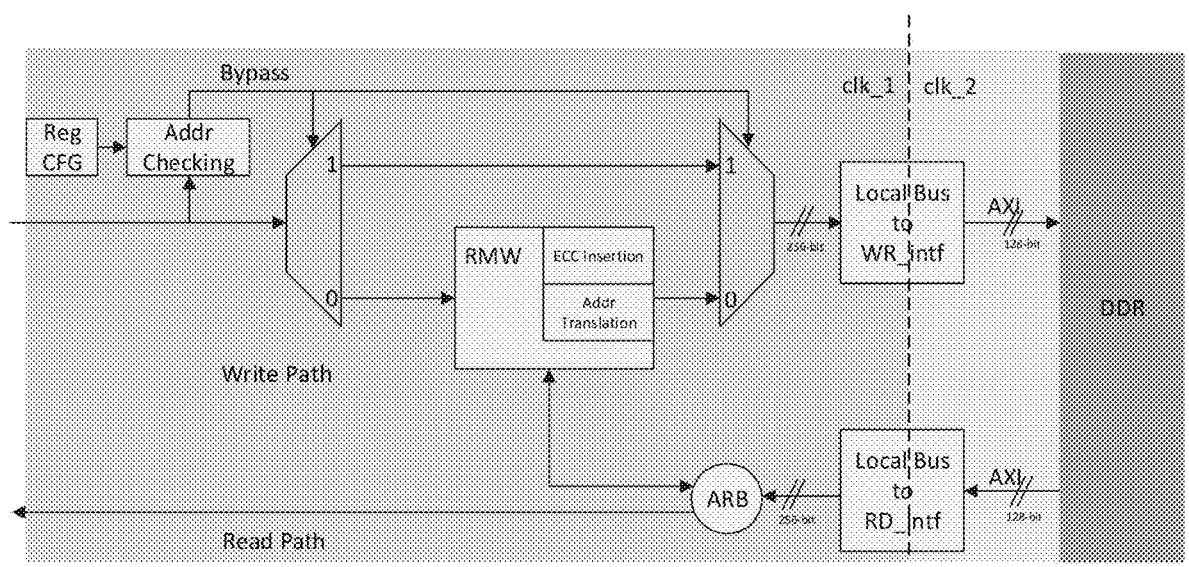
FIG. 7 is a block diagram illustrating an embodiment of a local bus converter that supports a local bus interface to advanced extensible interface (AXI) conversion.

FIG. 7 is a block diagram illustrating an embodiment of a local bus converter that supports a local bus interface to advanced extensible interface (AXI) conversion. In particular, the system of FIG. 7 provides an interface between versatile processing unit 112 and buffer management unit 118.

To simplify logic design and save logic components, a bus converter is designed to support a local bus interface to standard AXI4 interface conversion. AXI4 is a particular specification/protocol of the advanced extensible interface (AXI). The local bus interface provides transfer address, size, and data, while the interface converter downsizes the bus width to 128 bits and issues AXI transactions according to AXI4 protocol. A downsizer inside the interface converter is used to maintain the bandwidth between the two interfaces. In some embodiments, this is necessary because typically the reconfigurable FPGA/DSP modules 206 are not able to run at a frequency as high as the AXI clock.

The embodiment of FIG. 7 is capable of performing basic read and write transaction conversion. Additionally, the interface converter also has a Read-Modify-Write (RMW) error-correcting code (ECC) module to protect data between DDR (Double Data Rate) memory and the local compute engine.

In some embodiments, multiple flexible versatile processing units 112 are instantiated in a single system. A task that needs multiple acceleration units will be distributed in several different versatile processing units 112. The global AXI bus matrix provides full connections between any two versatile processing units 112. Any two versatile processing units 112 can be chained together through the global AXI bus matrix. In the example of FIG. 7, there are various components (e.g., logic components) between a client device and a DDR memory for data protection and ECC code insertion. In some embodiments, the logic components support two modes: bypass mode and ECC mode. Bypass mode is enabled when the CFG register selects the multiplexer to bypass the write path. In this bypass mode, all of the write data is written into the DDR memory directly. For example, if the CPU writes 1111_1111, 2222_2222, . . . , 8888_8888 into the DDR memory, the data will show up in the DDR memory physically as shown in Table 1 below.

TABLE 1

| DDR Physical Address | Bypass Mode Data in DDR | ECC Mode Data in DDR in ECC Mode |
|---|---|---|
| 0 | 1111_1111 | 1111_1111 |
| 4 | 2222_2222 | XX22_2222 (XX is 1111_1111's ECC) |
| 8 | 3333_3333 | 22YY_3333 (YY is 2222_2222's ECC) |
| ... | ... | ... |
| 48 | 8888_8888 | 55ZZ_6666 |

In some embodiments, when operating in ECC mode, the data layout in the DDR memory is shown in Table 1. As shown in Table 1, the ECC insertion and address translation provide necessary data adjustments. For the RWM function, a read operation may be performed from the DDR memory, which is modified using ECC insertion and address translation, and written back to the DDR memory. For a read operation, when in ECC mode, raw data is read from the DDR memory, which has the data and the ECC data (which needs some operation to remove the ECC and return the true data to the client). In the example above, read address 4 from the DDR memory will return XX22_2222 and address 8 will return 22YY_3333. From the client's viewpoint, the client wants the data to be 2222_2222. So, the system of FIG. 7, which may be positioned between the client and the DDR memory may perform two read operations to get XX22_2222 and 22YY_3333. The system of FIG. 7 then strips the XX and YY, and reorders the data to be 2222_2222 and return that data to the client.

Figure 8:
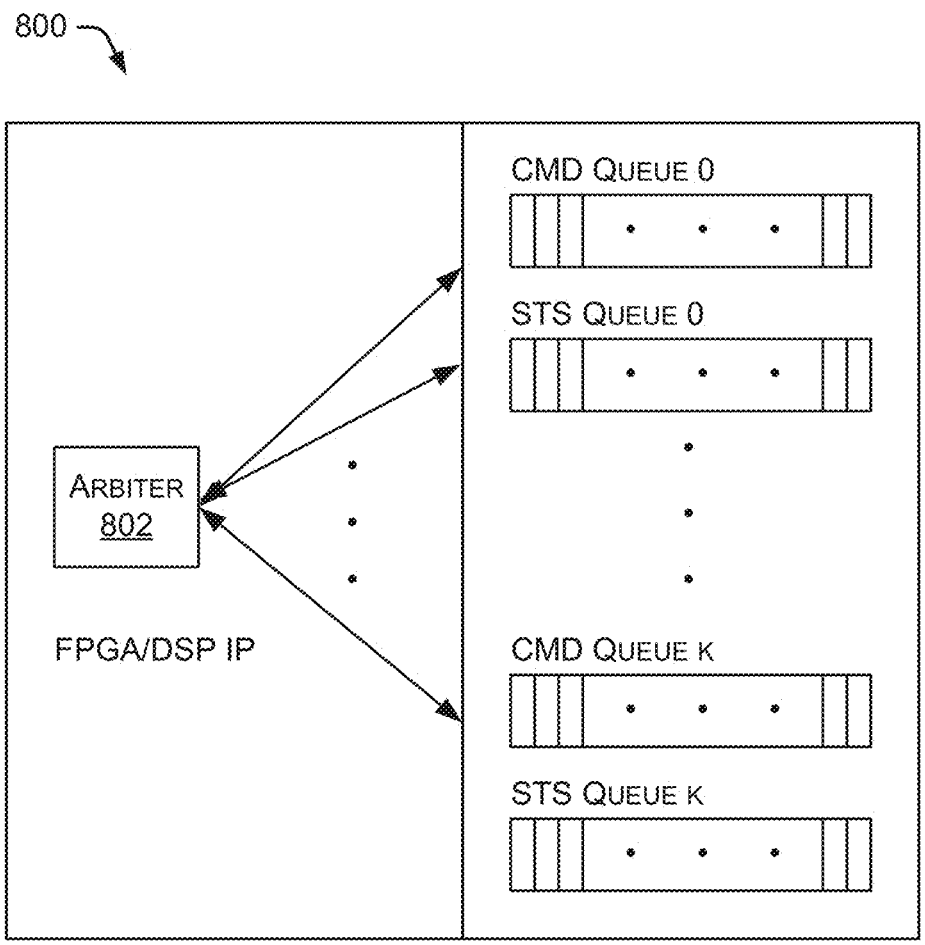
FIG. 8 illustrates an embodiment of a message management interface.

FIG. 8 illustrates an embodiment of a message management interface 800, which provides command and status queues for the CPU cluster to interact with the versatile processing units 112. As shown in FIG. 8, a multiple queue structure (both command (CMD) queues and Status (STS) queues) supports the ability of out-of-order execution and non-blocking execution schemes, which minimizes the CPU idle time. Depending on the arbitration design of the FPGA/DSP logic, commands from different queues can be executed out-of-order, in-order, or QoS-based. For commands that need to be executed in-order, they are typically put into the same command queue. Arbiter 802 supports the and implements the arbitration design of the system.

Figure 9:
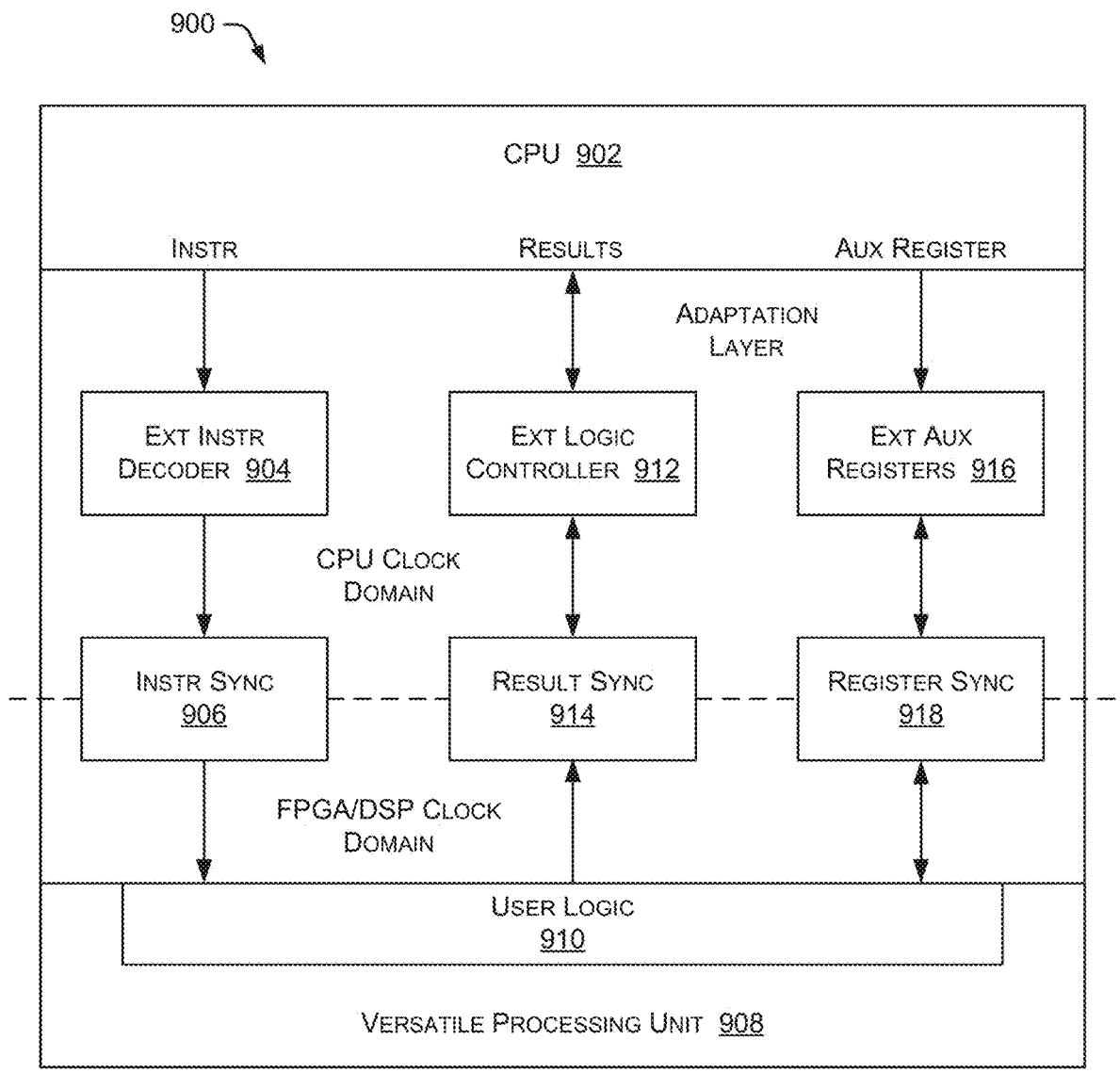
FIG. 9 illustrates an embodiment of an adaptation layer for a central processing unit (CPU) extension interface.

FIG. 9 illustrates an embodiment of an adaptation layer 900 for a central processing unit (CPU) extension interface. In some embodiments, a CPU with an extension interface is used with the systems and methods described herein. For example, the CPU extension interface is exposed to versatile processing units 112, which enables a user to define instructions and interact with the CPU processing pipeline. This approach improves system performance and reduces power consumption.

As shown in FIG. 9, a CPU 902 provides an extension interface so users can add and edit customized extensions, which may include instructions, condition codes, and core registers. This extension interface allows users to create customized instructions and make applications faster. In some embodiments, the clock of CPU 902 is faster than the FPGA/DSP clock. Thus, an adaptation layer is used to guarantee performance and function. The FPGA/DSP logic provides flexibility, but may introduce timing closure challenges which may degrade the performance of CPU 902. To overcome this timing issue and maintain the performance of CPU 902, the described systems and methods use the adaptation layer for the CPU extension interface as shown in FIG. 9.

In some embodiments, the extension instruction is sent by CPU 902 after internal decoding. Additional decoding occurs at the adaptation layer by external instruction decoder 904. Instr sync 906, results sync 914, and register sync 918 may synchronize instructions and results between different clocks. The output of instruction sync 906 is communicated to user logic 910 (located in versatile processing unit 908) in the FPGA/DSP and an extension logic controller 912. The extension logic controller 912 waits for results from user logic 910 and sends it back to CPU 902. The adaptation layer provides an extension auxiliary registers interface 916. After a register sync interface 918, the register can be accessed by user logic 910. In some embodiments, user logic 910 is defined by a user (e.g., customer). Using the power of the FPGA/DSP, a complicated instruction can be executed by the described hardware systems. The adaptation layer separates the CPU 902 clock and the FPGA/DSP clock, which ensures performance of CPU 902.

Figure 10:
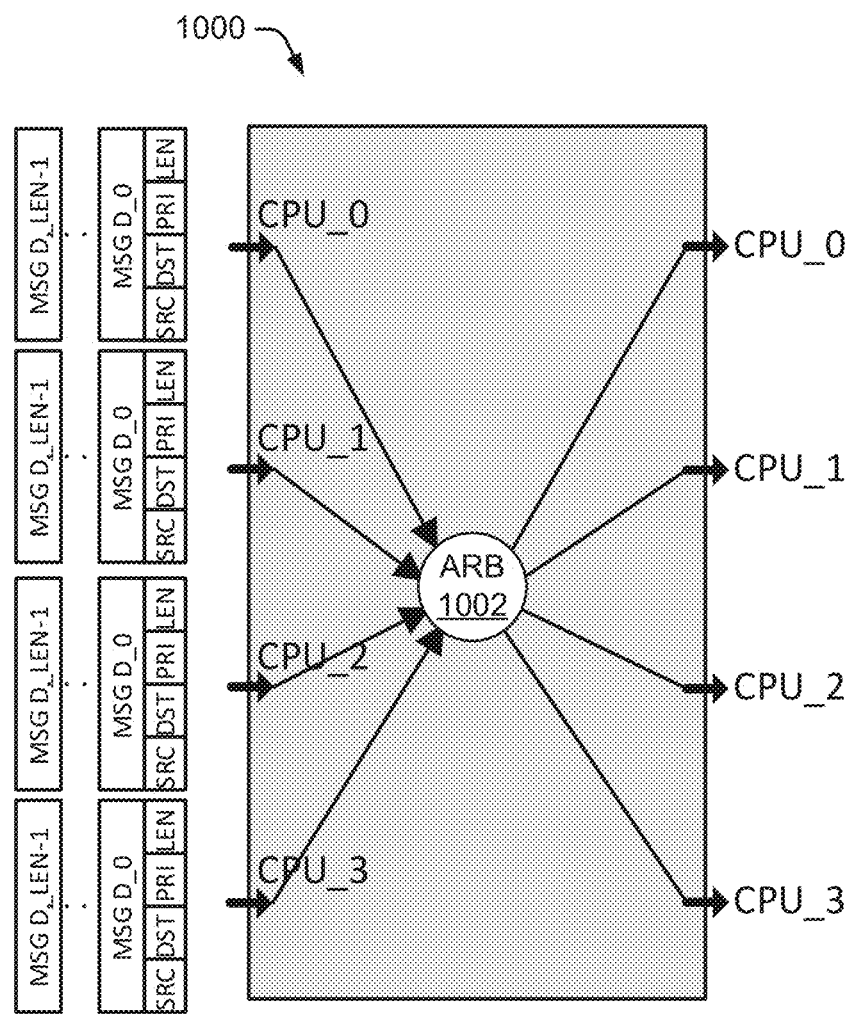
FIG. 10 illustrates an embodiment of an architecture of an inter process communication (IPC) hub.

FIG. 10 illustrates an embodiment of an architecture of an inter process communication (IPC) hub 1000. In some embodiments, IPC hub 1000 is used for exchanging information with a micro-CPU. Hardware-assisted IPC hub 1000 serves an IPC message based on the message header, which includes a message destination, a message source, a message priority, and a payload length. In some embodiments, a complete message package is prepared before the CPU can post it to IPC hub 1000. Messages delivered through IPC hub 1000 are asynchronous. As an asynchronous message, the CPU does not need to wait for any response from IPC hub 1000, which results in improved CPU utilization and throughput. If a response is required, a response from the destination can be sent using another IPC message. In some embodiments, a lower level hardware IPC hub only handles the message delivery and leaves the usage model to an upper level application, which results in better flexibility.

In some implementations, messages between micro-CPUs serve as a flow control and hence it's a sparse event (e.g., it doesn't happen frequently). Leveraging between hardware logic consumption and performance improvement, a single arbitration node 1002 serves all the CPUs' send message requests.

Figure 11:
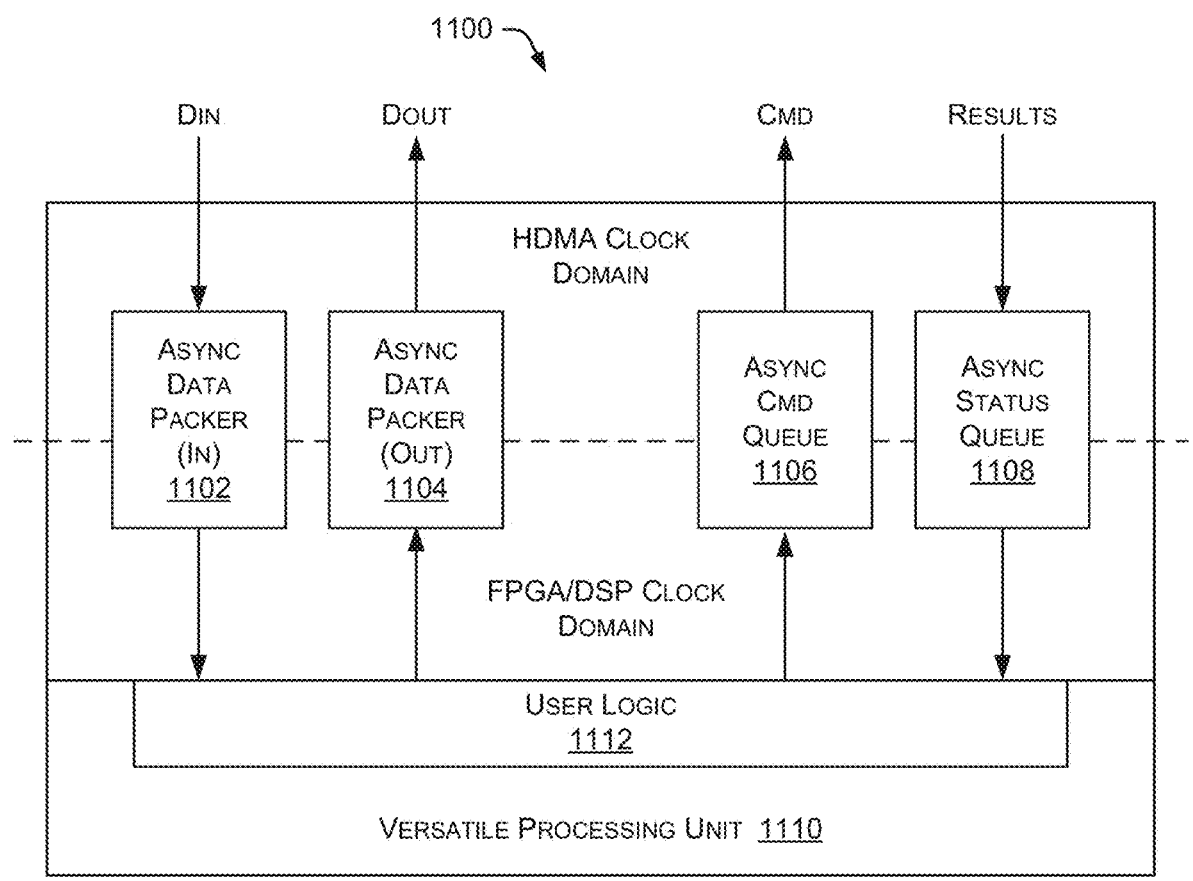
FIG. 11 illustrates an embodiment of a versatile processing unit to host direct memory access (DMA) interface.

FIG. 11 illustrates an embodiment of a versatile processing unit to host direct memory access (DMA) interface 1100. As shown in the example of FIG. 11, there are two interfaces between the HDMA and user logic 1112: a control interface and a data interface. The control interface delivers information to the HDMA and the data interface provides a channel for transferring data to/from the HDMA. In some embodiments, the data interface may be divided into two parts, a write channel and a read channel. To ease the timing closure for user logic 1112 in the FPGA/DSP, the user logic clock is halved and the data bus width is doubled. In some examples, digital circuits may work under a clock that controls the flop/registers in the system. In order for the system to perform correctly, the registers may need to act at the same time aligned by the clock. The procedure that performs this alignment may be referred to as "timing closure." In some examples, a slower clock may make it easier to close the timing. Therefore, if the clock is halved and the bus width is doubled, the bandwidth is maintained while the clock is slower, which may help make the timing closure easier. A data packing module is used to handle the clock domain conversion. As shown in FIG. 11, user logic 1112 is part of versatile processing unit 1110.

In a particular example, a CPU may need external hardware logic to assist it in performing data transfers, such as copying data from one location to another. The CPU will then have a command (e.g., copy, source location, destination location, data amount to transfer) pushed into an Async Cmd Queue 1106. In some situations, this type of data transfer may take some time to complete. Thus, the CPU may move forward with other jobs, then return to check an Async Status Queue 1108 to see if the data transfer is complete. If there is an entry in the Async Status Queue 1108, the CPU reads the entry and determines whether the previously submitted data transfer job finished successfully. This approach may improve the efficiency of the CPU. In some embodiments, an Async Data Packer 1102 packs incoming data into a more compact package, which can make the data transfer inside the system more efficient. Similarly, an Async Data Packer 1104 packs outgoing data into a more compact package, which may improve the efficiency of the data transfer.

Figure 12:
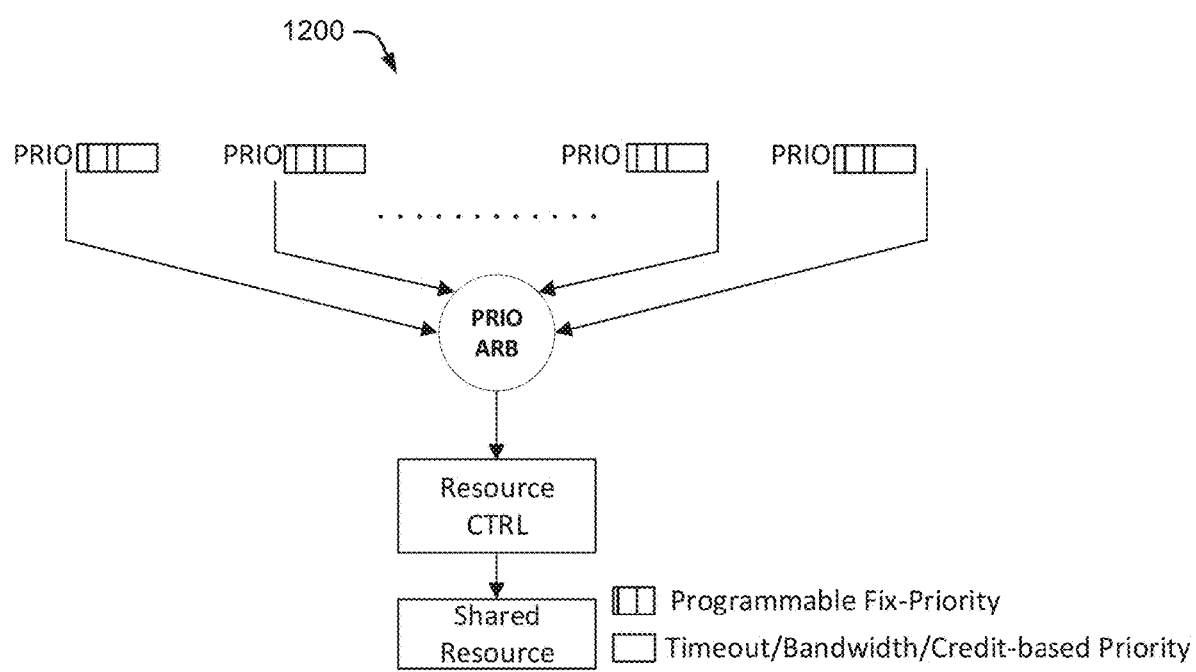
FIG. 12 illustrates an embodiment of a structure for a quality of service (QoS) arbiter.

FIG. 12 illustrates an embodiment of a structure 1200 for a quality of service (QoS) arbiter. Depending on particular aspects of the system design, accessing a central shared resource, such as DDR, may have different requirements. For example, some designs require minimum bandwidth while others may have strict timeout limits. To provide this type of flexibility, while meeting the design requirements, a traditional programmable fixed priority and a timeout/bandwidth/credit-based (TBC-based) priority schemes are encompassed together. If fixed priority is not used, then all of these priorities are set to zero and all TBC priority fields are the same. Tor TBC-based priority, only timeout and one bandwidth and credit are chosen to generate the two-bit TBC-based priority. In some embodiments, timeout has a higher priority than bandwidth and credit priority.

In some embodiments, Prio Arb shown in FIG. 12 is an arbiter choosing which client to serve based on the priority of the clients. When the Prio Arb determines the next client to be served (e.g., a granted client), the Prio Arb passes a command/request associated with that client to Resource CTRL (a resource controller). When the Resource CTRL finishes the command/request, it will pass information back to the Prio Arb. In response, the Prio Arb will pass the same information to the granted client.

Figure 13:
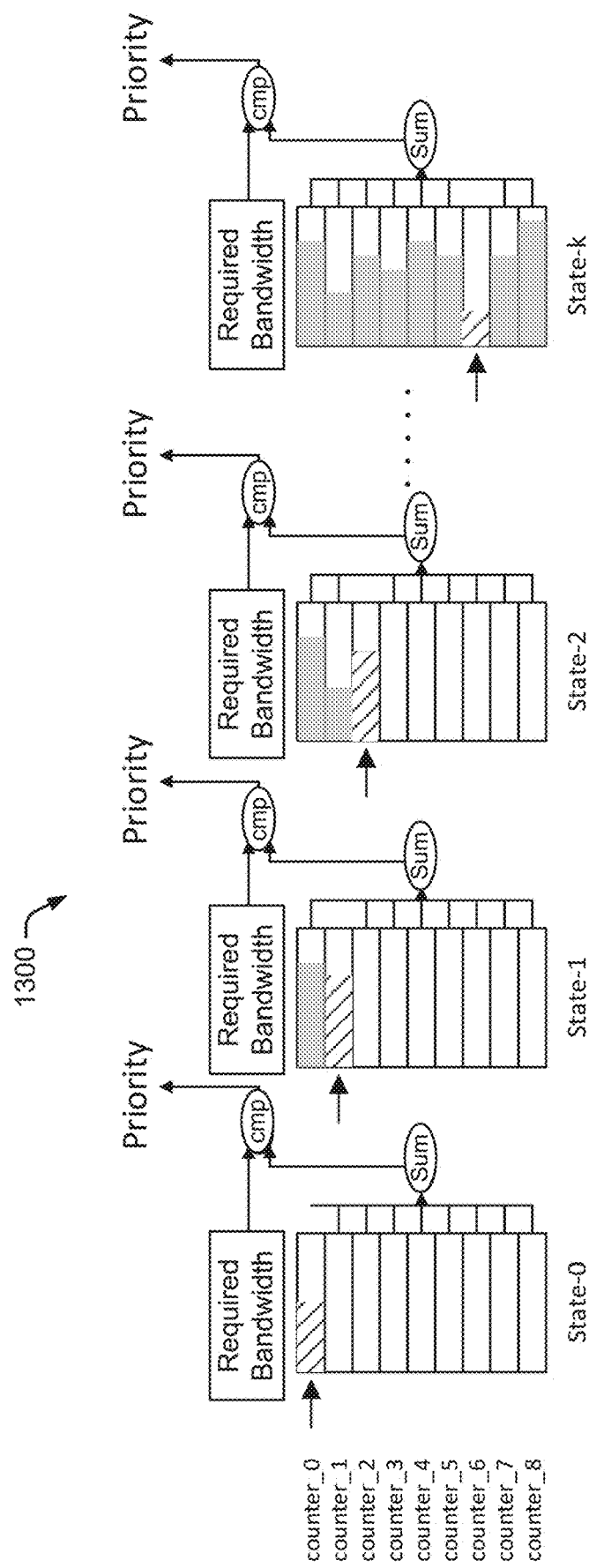
FIG. 13 illustrates an embodiment of bandwidth evaluation for priority generation.

FIG. 13 illustrates an embodiment of bandwidth evaluation 1300 for priority generation. As shown in FIG. 13, the bandwidth evaluation is a bin-based design. In some embodiments, one second is divided into eight segments and the bandwidth of the past one second is the sum of the previous eight segments. The bandwidth is compared with the programmed required bandwidth to generate the priority. The counter_X is used to record how much data was transferred in the corresponding Xth segment. The number of counters needed is dependent on how much bandwidth fluctuation the design can tolerate.

The priority generation illustrated in FIG. 13 may be based on the required bandwidth (e.g., set by a micro-CPU) and the actual bandwidth calculated in the past time period. For example, the past time period may be the past X microseconds, the past X milliseconds, or the past X seconds, depending on the amount of time each counter_X accumulates for. In the example of FIG. 3, there are nine counters numbered 0 to 8. If each counter counts consecutively for 1 microsecond and stops, the result of the nine counters is measuring the actual bandwidth during the past 9 microseconds. The example states shown in FIG. 13 are described below in Table 2. The example shown in Table 2 considers that the bandwidth requirement is 500 transactions in the past 9 microseconds. In the example of Table 2, the priority of the bus at state 0 is high because the actual bandwidth is 100, which is smaller than the required 500).

TABLE 2

| Time (microsecond) | Counter values | Actual bandwidth in the past 9 seconds | Priority of this bus |
|---|---|---|---|
| [0,1) --> state 0 | Counter0 = 100<br>Counter = 0 | 100 | high |
| [1,2) --> state 1 | Counter0 = 100<br>Counter1 = 10<br>Counterx = 0 | 110 | high |
| [2,3) --> state 2 | Counter0 = 100<br>Counter1 = 10<br>Counter2 = 400 | 510 | low |
| [3,4) --> state 3 | Counter0 = 100<br>...<br>Counter3 = 1<br>Counterx = 0 | 511 | low |
| [4,5) --> state 4 | ... | ... | ... |
| [5,6) --> state 5 | ... | ... | ... |
| [6,7) --> state 6 | ... | ... | ... |
| [7,8) --> state 7 | ... | ... | ... |
| [8,9) --> state 8 | Counter0 = 100<br>...<br>Counter8 = 2 | ... | ... |
| [9,10) --> state 9 | Counter0 = 7<br>Counter1 = 10<br>...<br>Counter8 = 2 | 427 | high |
| [10,11) --> state 10 | Counter0 = 7<br>Counter1 = 80<br>...<br>Counters = 2 | 497 | high |

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A near-memory computing system comprising:
    a host command processing system;
    a computational engine associated with a solid-state drive, wherein the computational engine includes a plurality of versatile processing unit slices coupled to one another, wherein the plurality of versatile processing unit slices are configured to perform different tasks in parallel with one another; and
    a host direct memory access module configured to access memory devices independently of a central processing unit
    wherein each of the plurality of versatile processing unit slices includes:
    a local static random access memory;
    a plurality of field-programmable gate array/digital signal processing arrays
    a central processing unit;
    a memory device;
    a direct memory access interface; and
    a buffer management interface.

2. The near-memory computing system of claim 1, wherein each of the plurality of versatile processing unit slices is configured to receive data from a host memory and store the data in the local static random access memory.

3. The near-memory computing system of claim 1, wherein the plurality of versatile processing unit slices share a common data path, and wherein a quality of service arbiter optimizes access to the data path by the plurality of versatile processing unit slices.

4. The near-memory computing system of claim 1, wherein each of the plurality of versatile processing unit slices includes the central processing unit configured to manage job scheduling by the particular versatile processing unit slice.

5. The near-memory computing system of claim 1, wherein each of the plurality of versatile processing unit slices includes a static random access memory that includes a plurality of memory banks, and wherein each of the plurality of memory banks are coupled to at least one arbiter.

6. A near-memory computing system comprising:
   a host command processing system; and
   a computational engine associated with a solid-state drive, wherein the computational engine includes a plurality of versatile processing unit slices coupled to one another, wherein the plurality of versatile processing unit slices are configured to perform different tasks in parallel with one another, and wherein each of the plurality of versatile processing unit slices includes:
   a local static random access memory; and
   a plurality of field-programmable gate array/digital signal processing arrays,
   wherein each of the plurality of versatile processing unit slices further includes:
   a central processing unit;
   a memory device;
   a direct memory access interface; and
   a buffer management interface.

7. A near-memory computing system comprising:
   a host command processing system; and
   a computational engine associated with a solid-state drive, wherein the computational engine includes a plurality of versatile processing unit slices coupled to one another, wherein the plurality of versatile processing unit slices are configured to perform different tasks in parallel with one another, and wherein each of the plurality of versatile processing unit slices includes:
   a local static random access memory; and
   a plurality of field-programmable gate array/digital signal processing arrays;
   wherein each of the plurality of versatile processing unit slices includes a central processing unit configured to manage job scheduling by the particular versatile processing unit slice.

* * * * *